(12) United States Patent
Pan et al.

(10) Patent No.: US 11,202,972 B2
(45) Date of Patent: Dec. 21, 2021

(54) AUTOMATIC TRITIUM EXTRACTION DEVICE AND METHOD FOR ENVIRONMENTAL MONITORING

(71) Applicant: Zhejiang Hengda Instrumentation Co., Ltd., Hangzhou (CN)

(72) Inventors: Zhidong Pan, Hangzhou (CN); Shibo Liu, Hangzhou (CN); Naizheng Zhou, Hangzhou (CN); Cheng Wu, Hangzhou (CN); Lulu Zheng, Hangzhou (CN)

(73) Assignee: ZHEJIANG HENGDA INSTRUMENTATION CO., LTD., Hangzhou (CN)

( * ) Notice: Subject to any disclaimer, the term of this patent is extended or adjusted under 35 U.S.C. 154(b) by 0 days.

(21) Appl. No.: 16/896,689

(22) Filed: Jun. 9, 2020

(65) Prior Publication Data

US 2020/0384382 A1  Dec. 10, 2020

(30) Foreign Application Priority Data

Jun. 10, 2019 (CN) .......................... 201910496784.4

(51) Int. Cl.
*B01D 3/02* (2006.01)
*B01D 3/42* (2006.01)
(Continued)

(52) U.S. Cl.
CPC ............. *B01D 3/4294* (2013.01); *B01D 3/32* (2013.01); *G01N 1/34* (2013.01); *G01N 1/40* (2013.01);
(Continued)

(58) Field of Classification Search
CPC . B01D 3/02; B01D 3/085; B01D 3/10; B01D 3/12; B01D 5/006; B01D 5/0063;
(Continued)

(56) References Cited

U.S. PATENT DOCUMENTS

| 1,725,528 | A | * | 8/1929 | Konter | ...................... | B01D 3/02 |
| | | | | | | 202/254 |
| 3,864,214 | A | * | 2/1975 | Ohakas | ..................... | B01D 3/00 |
| | | | | | | 202/186 |

(Continued)

*Primary Examiner* — Jonathan Luke Pilcher
(74) *Attorney, Agent, or Firm* — Muncy, Geissler, Olds & Lowe, P.C.

(57) ABSTRACT

An automatic tritium extraction device for environmental monitoring comprises a distillation chamber, a temperature control unit, a condensation unit and an auxiliary condensation unit. The distillation chamber is connected to a first pump, a second pump and a third pump. A delivery pipe comprises a first vertical pipe, a second vertical pipe and an oblique pipe which inclines upwards from the distillation chamber to the condensation unit. An automatic tritium extraction method for environmental monitoring comprises the following steps: 1) cleaning of a distillation chamber; 2) distillation rising; 3) distillation; 4) condensation; 5) discharging samples out of the distillation chamber. By the adoption of the automatic tritium extraction device and method for environmental monitoring, fully-automatic distillation and condensation of environmental tritium samples, automatic cleaning of the distillation chamber, and automatic and accurate addition of required agents are realized, and fully-automatic acquisition, preparation, distillation, purification, measurement and analysis of environmental tritium can be completed; and manual intervention is reduced, so that monitoring results are more accurate, and labor costs are saved.

7 Claims, 2 Drawing Sheets

(51) Int. Cl.
  *B01D 3/32* (2006.01)
  *G01N 1/34* (2006.01)
  *G01N 1/40* (2006.01)
  *B01D 5/00* (2006.01)
  *B01D 1/00* (2006.01)

(52) U.S. Cl.
  CPC .............. *B01D 1/0017* (2013.01); *B01D 3/02* (2013.01); *B01D 5/006* (2013.01); *G01N 1/4022* (2013.01)

(58) Field of Classification Search
  CPC ......... B01D 5/0066; B01D 59/04; G21F 9/08; G01T 1/2047
  See application file for complete search history.

(56) References Cited

U.S. PATENT DOCUMENTS

| | | | | |
|---|---|---|---|---|
| 4,892,684 A | * | 1/1990 | Harp | G21F 9/08 376/308 |
| 2013/0153397 A1 | * | 6/2013 | Carl | B01D 3/108 203/4 |
| 2014/0151215 A1 | * | 6/2014 | Yang | B01D 5/009 203/44 |

* cited by examiner

AUTOMATIC TRITIUM EXTRACTION DEVICE AND METHOD FOR ENVIRONMENTAL MONITORING

BACKGROUND OF THE INVENTION

1. Technical Field

The invention belongs to the technical fields of environmental protection and automatic equipment, in particular to an automatic tritium extraction device and method for environmental monitoring.

2. Description of Related Art

Tritium is a radioactive substance with a half-life period of 12.6 years. Most tritium in the air will eventually turn into tritium oxide-water steam which, together with ordinary water, is involved in water circulation, and thus, human beings are likely to be exposed to tritium radiation. During environmental protection, monitoring of the content of tritium in water and air has received extensive international attention. Of all existing tritium monitoring methods, indirect measurement methods are obviously superior to other methods and are implemented on the basis of the following principle: air tritium oxide samples are prepared through an air condensation method and are taken back to the laboratory, then tritium sample purification is carried out through a manual distillation and condensation method, after that, the tritium oxide samples and a scintillation solution are quantitatively injected into sample bottles in a certain proportion, and finally, the sample bottles are placed into an instrument one by one for analysis. Existing distillation and concentration methods typically include semi-automatic distillation and manual distillation, wherein semi-automatic distillation can fulfill automatic distillation of single samples, and cleaning is performed manually after distillation; and traditionally, manual distillation is carried out in the laboratory, and all operations are performed manually. Both distillation methods have the following drawbacks: 1, sample preparation personnel may be exposed to radiation when the concentration of tritium samples is high; 2, experimenters should be highly skilled to complete quantitative sample preparation, personal operation errors may be caused, the experimental operation time is long, and manual attendance is required; and 4, the cleaning process needs to be manually completed, so that full automation of the process is not available, and online monitoring of air tritium cannot be realized either.

BRIEF SUMMARY OF THE INVENTION

The technical issue to be settled by the invention is to overcome the defects of the prior art by providing an automatic tritium extraction device and method for environmental monitoring to fulfill automatic distillation of tritium samples and automatic cleaning of distillation chambers and to save labor costs.

The technical solution adopted by the invention to settle the aforesaid technical issue is as follows: an automatic tritium extraction device for environmental monitoring comprises a distillation chamber, a temperature control unit used to heat the distillation chamber, a condensation unit connected to the distillation chamber through a delivery pipe, and an auxiliary condensation unit used to cyclically deliver a condensing agent into the condensation unit, wherein the distillation chamber is connected to a first pump for delivering agents into the distillation chamber, a second pump for delivering samples into the distillation chamber, and a third pump for communicating the distillation chamber with the outside; and the delivery pipe comprises a first vertical pipe connected to the top of the distillation chamber, a second vertical pipe connected to the top of the condensation unit, and an oblique pipe obliquely connected between the first pipe and the second pipe, and the oblique pipe inclines upwards from the distillation chamber to the condensation unit.

Furthermore, a first spherical bulge with a larger inner diameter is disposed on the first vertical pipe, and a second spherical bulge with a large inner diameter is disposed on the second vertical pipe.

Furthermore, the first pump is connected to an upper part of the distillation chamber, the second pump is also connected to the upper part of the distillation chamber, and the third pump is connected to the bottom of the distillation chamber and is used to deliver air into the distillation chamber or discharge samples in the distillation chamber to the outside.

Furthermore, a main part of the distillation chamber is cylindrical, the bottom of the distillation chamber is conical, and the temperature control unit comprises heating elements encircling the outer wall of the main part of the distillation chamber and a temperature control switch disposed between the heating elements and the outer wall of the distillation chamber.

Furthermore, the agents include a cleaning agent and a distilling agent.

Furthermore, the condensation unit comprises a condensing agent circulation chamber and a spiral heat-exchange tube disposed in the condensing agent circulation chamber, and the condensing agent circulation chamber comprises an inlet connected to the second vertical pipe and an outlet connected to a collection tank.

Furthermore, the second pump is connected to a sample tank for containing the samples.

Furthermore, the auxiliary condensation unit comprises a cavity for storing the condensing agent, a power device for cyclically delivering the condensing agent into the condensing agent circulation chamber, an upper tube connected to an upper part of the condensing agent circulation chamber, and a lower tube connected to a lower part of the condensing agent circulation chamber.

The invention further discloses an automatic tritium extraction method for environmental monitoring, which comprises the following steps:

1) Cleaning of a distillation chamber: a cleaning agent is used, a first pump is started to pump a specified quantity of the cleaning agent into the distillation chamber, a temperature control unit is started to heat the distillation chamber to a preset temperature, then a third pump is started to deliver outside air into the distillation chamber, and when agitation cleaning of the distillation chamber is completed, mixed liquor in the distillation chamber is discharged by the third pump;

2) Distillation rinsing: a distilling agent is used, a second pump is started to pump a specified quantity of samples into the distillation chamber, then, the first pump is started to pump a specified quantity of the distilling agent into the distillation chamber, and the temperature control unit is started to maintain the temperature of the outer wall of the distillation chamber at the preset temperature, and a collection tank containing finished products is replaced with an empty collection tank;

3) Distillation: the distilling agent is used, the second pump further pumps a specified quantity of samples into the distillation chamber, the first pump is started to pump a specified quantity of the distilling agent into the distillation chamber, and the temperature control unit is started to maintain the distillation chamber at a preset temperature and is stopped when the distillation amount reaches a preset value;

4) Carrying out condensation when Step 2) and Step 3) are performed: an auxiliary condensation unit is started, and a condensing agent is delivered into a condensing agent circulation chamber via a lower tube and flows back into a cavity via an upper tube after being subjected to heat exchange in the condensing agent circulation chamber;

5) Discharging samples out of the distillation chamber: the second pump further pumps the rest of samples in a sample tank into the distillation chamber, and the third pump is started to discharge all the samples out of the distillation chamber.

Preferably, the preset temperature in Step 1) and Step 2) is 80-100° C., and the preset value in Step 3) is 500-700 mL.

The invention has the following beneficial effects: fully-automatic distillation and condensation of environmental tritium samples, automatic cleaning of the distillation chamber, and automatic and accurate addition of required agents are realized. The automatic tritium extraction device fills the blank of fully-automatic distillation and purification of environmental tritium analysis and can complete fully-automatic acquisition, preparation, distillation, purification, measurement and analysis of environmental tritium together with a tritium analysis meter, so that an environmental tritium analysis system is free of attendance in the entire process, and fully-automatic monitoring of regions with severe environmental tritium radiation is realized; and the automatic tritium extraction device greatly reduces manual intervention, so that monitoring results are more accurate, labor costs are saved, and the probability of physical harm to relevant service personnel is drastically lowered.

DETAILED DESCRIPTION OF THE INVENTION

To provide a better understanding of the technical solutions of the invention for those skilled in the art, the technical solutions of the embodiments of the invention will be clearly and completely described below in conjunction with the accompanying drawings of the embodiments. Obviously, the embodiments in the following description are merely illustrative ones, and are not all possible ones of the invention. All other embodiments obtained by those ordinarily skilled in the art without creative labor should also fall within the protection scope of the invention.

Figure 1:
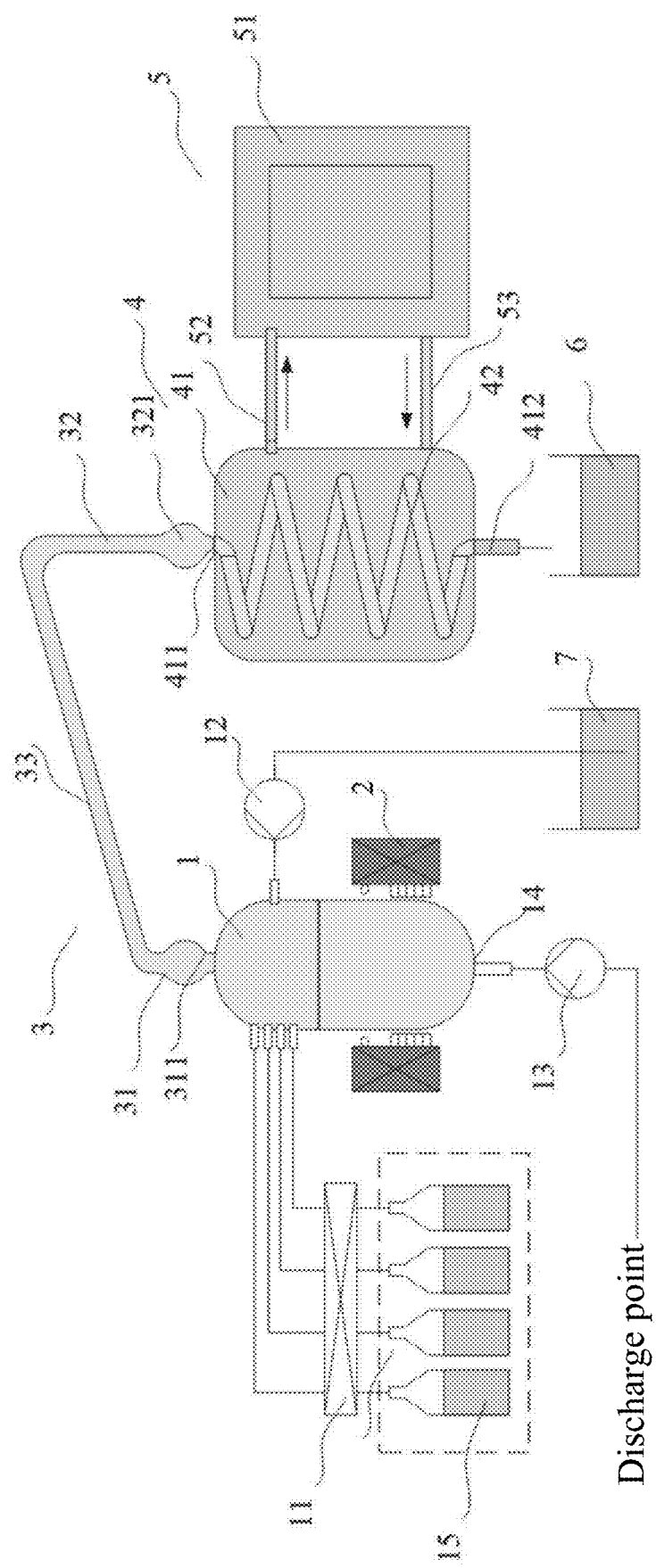
FIG. 1 is a flow structural diagram of the invention.

As shown in FIG. 1, 2, an automatic tritium extraction device for environmental monitoring comprises a distillation chamber 1, a temperature control unit 2, a condensation unit 4 and an auxiliary condensation unit 5, wherein a main part of the distillation chamber 1 is cylindrical, and the bottom of the distillation chamber 1 is conical; the temperature control unit 2 encircles one part of the outer wall of the main part of the distillation chamber 1 and is used to heat the distillation chamber 1; one end of the condensation unit 4 is connected to the top of the distillation chamber 1, and the other end of the condensation unit 4 is connected to a delivery pipe 3 at the top of the condensation unit 4; and the auxiliary condensation unit 5 is connected to the condensation unit 4 and is used to cyclically deliver a condensing agent into the condensation unit 4.

An upper part of the distillation chamber 1 is connected to multiple agent bottles through multiple pipes and a first pump 11, wherein cleaning agents or distilling agents are contained in the multiple bottles 15, and the first pump 11 may be a WK10 high-precision micro peristaltic pump capable of accurately regulating and controlling the delivery quantity. The upper part of the distillation chamber 1 is also connected to a sample tank 7 containing to-be-tested tritium-containing samples through a pipe and a second pump 12, wherein the second pump 12 is used to transport the tritium-containing samples into the distillation chamber 1. A sample outlet 14 is formed in the conical bottom of the distillation chamber 1 and is communicated with the outside through a third pump 13 to discharge the samples in the distillation chamber 1 to the outside.

Figure 2:
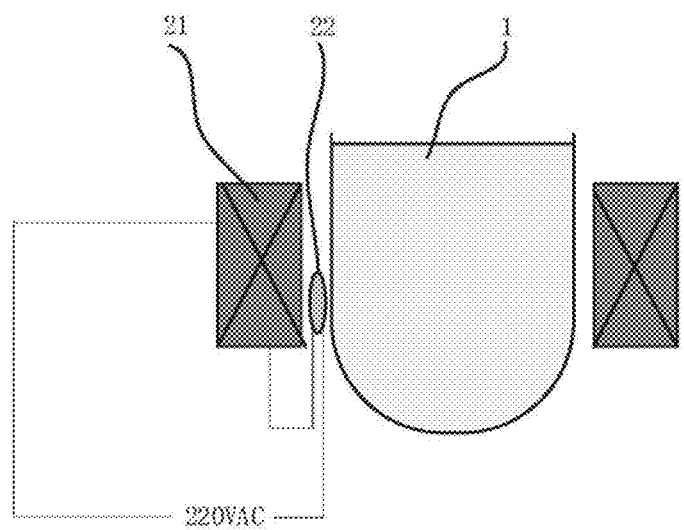
FIG. 2 is a collaboration diagram of a temperature control unit and a distillation chamber of the invention.

As shown in FIG. 2, the temperature control unit 2 comprises heating elements 21 encircling the outer wall of the main part of the distillation chamber 1 and a temperature control switch 22 disposed between the heating elements 21 and the outer wall of the distillation chamber 1, wherein the heating elements 21 generate heat for distillation in the distillation chamber 1; and the temperature control switch 22 is used to sense the temperature of the outer wall surface of the distillation chamber 1 in real time, timely and automatically power on the heating elements 21 to heat the distillation chamber 1 when the temperature of the outer wall surface of the distillation chamber 1 is lower than a preset value 80-100° C., and timely and automatically power off the heating elements 21, when the temperature of the outer wall surface of the distillation chamber 1 is higher than the preset value 80-100° C., to maintain the temperature of the distillation chamber 1 at the preset value to ensure continuous and efficient distillation.

The condensation unit 4 comprises a hollow condensing agent circulation chamber 41 and a spiral heat-exchange tube 42 disposed in the condensing agent circulation chamber 41, wherein the spiral heat-exchange tube 42 allows tritium sample steam to circulate therein, the condensing agent circulation chamber 41 is filled with the condensing agent which may be deionized distilled water, the tritium sample steam in the spiral heat-exchange tube 42 is cooled and condensed into liquid by the condensing agent, an inlet 411 communicated with the delivery pipe 3 is formed in the top of the condensing agent circulation chamber 41, an outlet 412 communicated with an environmental tritium sample collection tank 6 may be formed in the bottom of the condensing agent circulation chamber 41, and an airtight container is formed by other parts of the condensing agent circulation chamber 41 to allow the condensing agent to circulate therein.

The auxiliary condensation unit 5 is used to control the condensing process of the condensation unit 4 and comprises a cavity 51 for storing the condensing agent, an upper tube 52 for communicating the cavity 51 with an upper part of the condensing agent circulation chamber 41, a lower tube 53 for communicating the cavity 51 with a lower part of the condensing agent circulation chamber 41, and a power device for driving the condensing agent to flow into the condensing agent circulation chamber 41 from the cavity 51 through the lower tube 53 or driving the condensing agent to flow into the cavity 51 from the condensing agent circulation chamber 41 through the upper tube 52, wherein the power device is a peristaltic pump or a diaphragm pump and is used to drive the condensing agent to cyclically flow between the condensing agent circulation chamber 41 and the cavity 51.

The delivery pipe 3 for guiding distillation gas generated in the distillation chamber 1 into the condensation unit 4 comprises a first vertical pipe 31 connected to the top of the distillation chamber 1, a second vertical pipe 32 connected to the top of the condensing agent circulation chamber 41, and an oblique pipe 33 obliquely connected between the first vertical pipe 31 and the second vertical pipe 32, wherein the top of the distillation chamber 1 is located on the same horizontal plane as the top of the condensing agent circulation chamber 41, and the oblique pipe 33 inclines upwards from the distillation chamber 1 to the condensation unit 4, that is, the second vertical pipe 32 is longer than the first vertical pipe 31.

A first spherical bulge 311 with a larger inner diameter is formed in the first vertical pipe 31, is close to the top of the distillation chamber 1 and is spaced from the top of the top of the distillation chamber 1 by a small distance, so that steam output from the top of the distillation chamber 1 passes through the first vertical pipe 31 with the inner diameter sharply decreased to form a micro positive pressure and then enters the first spherical bulge 311 with the larger inner diameter to form a micro negative pressure, in this way, sample drops carried by steam are prevented from entering the condensation unit 4 via the delivery pipe 3, and the monitoring accuracy of the environmental tritium samples is guaranteed.

A second spherical bulge 321 with a larger inner diameter is formed in the second vertical pipe 32, is close to the top of the condensing agent circulation chamber 41 and is spaced from the top of the condensing agent circulation chamber 41 by a small distance, so that steam entering the condensing agent circulation chamber 41 first passes through the second spherical bulge 321 with the inner diameter sharply increased to be pre-condensed and then enters the condensing agent circulation chamber 41 via the second vertical pipe 32 with a smaller inner diameter, thus improving the condensation efficiency.

After the automatic tritium extraction device is started, the distillation chamber 1 is automatically cleaned at first, then, the environmental tritium samples and the distilling agent enter the distillation chamber, the temperature control unit 2 is started to carry out controllable distillation, and steam enters the steam delivery pipe 3, wherein one part of the steam is condensed to flow back into the distillation chamber 1 to be re-distillated under the effect of the structure of the first spherical bulge 311 at a port of the first vertical pipe 31 and the oblique upward structure of the oblique pipe 33, and the other part of the steam enters the condensation unit 4 via the steam delivery pipe 3 and is mostly condensed in the spiral heat-exchange tube 42 in the condensing agent circulation chamber 41 under the effect of the structure and temperature to flow into the environmental tritium sample collection tank 6 under the effect of gravity; and the steam and the condensing agent exchange heat in the spiral heat-exchange tube 42, so that the temperature of the steam drops, the temperature of the condensing agent rises, the condensing agent with the temperature increased returns into the cavity 51 via the upper tube 52, and the low-temperature condensing agent in the cavity 51 enters the condensing agent circulation chamber 41 via the lower tube 53, and thus, the condensing capacity of the condensation unit 4 is guaranteed.

An automatic tritium extraction method for environmental monitoring comprises the following steps:

1) Cleaning of a distillation chamber: a cleaning agent is used, a first pump is started to pump the cleaning agent into the distillation chamber, and the quantity of the cleaning agent pumped into the distillation chamber is accurately controlled; the temperature control unit is started to increase the temperature of the outer wall surface of the distillation chamber 1 to 80-100° C.; a third pump is started to deliver outside air into the distillation chamber 1 to agitate the cleaning agent to clean the distillation chamber 1, and at this moment, a second pump and a condensation unit are stopped; and when agitation cleaning of the distillation chamber is completed a period of time later, the third pump is started again to discharge mixed liquor in the distillation chamber 1 out of the distillation chamber 1 via a sample outlet 14;

2) Distillation rinsing: the cleaning agent is replaced with a distilling agent, the second pump is started to pump a specified quantity of samples, namely one third of samples in a sample tank 7, into the distillation chamber 1; then, the first pump is started to pump a specified quantity of the distilling agent, in proportion with the one third of the samples, into the distillation chamber 1 from different bottles; the samples and the distilling agent are mixed; and the temperature control unit is kept in the on-state to maintain the temperature of the outer wall surface of the distillation chamber 1 at 80-100° C.;

3) Distillation: a collection tank containing environmental tritium finished products in step 2) is replaced with an empty collection tank, and the second pump further pumps one third of samples into the distillation chamber 1 from the sample tank 7; the first pump is started to pump a specified quantity of the distilling agent, in proportion with the one third of samples, into the distillation chamber 1 from different bottles; and temperature control unit is kept in the on-state to maintain the temperature of the outer wall surface of the distillation chamber 1 at 80-100° C. and is stopped when the distillation amount reaches a preset value 500-700 mL;

4) Carrying out condensation when Step 2) and Step 3) are performed: an auxiliary condensation unit is started, a power device delivers a condensing agent into a condensing agent circulation chamber 41 from a cavity via a lower tube 53 and recovers the condensing agent subjected to heat exchange in the condensing agent circulation chamber 41 back into the cavity 51 via an upper tube in the direction of arrow;

5) Discharging samples out of the distillation chamber: the second pump further pumps the last one third of samples into the distillation chamber 1 from the sample tank 7; and the first pump is stopped, and the third pump is started to discharge all the samples 1 in the distillation chamber 1 out of the distillation chamber 1 via the sample outlet 14; and 6) Monitoring: liquid environmental tritium finished products in the collection tank 6 are measured and analyzed by a tritium analysis meter.

The above specific embodiments are merely used to explain the invention, and are not intended to limit the invention. Any modifications or transformations of the invention made on the basis of the spirit of the invention and within the protection scope of the claims should also fall within the protection scope of the invention.

What is claimed is:

1. An automatic tritium extraction device for environmental monitoring, comprising a distillation chamber, a temperature control unit used to heat the distillation chamber, a condensation unit connected to the distillation chamber through a delivery pipe, and an auxiliary condensation unit used to cyclically deliver a condensing agent into the condensation unit, wherein the distillation chamber is connected to a first pump for delivering a distilling fluid and a cleaning fluid into the distillation chamber, a second pump for delivering samples into the distillation chamber, and a third pump for communicating the distillation chamber with an outside; and the delivery pipe comprises a first vertical pipe connected to a top of the distillation chamber, a second vertical pipe connected to a top of the condensation unit, and an oblique pipe obliquely connected between the first pipe and the second pipe, and wherein the oblique pipe inclines upwards from the distillation chamber to the condensation unit.

2. The automatic tritium extraction device for environmental monitoring according to claim 1, wherein a first spherical bulge is disposed on the first vertical pipe, and a second spherical bulge is disposed on the second vertical pipe.

3. The automatic tritium extraction device for environmental monitoring according to claim 1, wherein the first pump is connected to an upper part of the distillation chamber, the second pump is also connected to the upper part of the distillation chamber, and the third pump is connected to a bottom of the distillation chamber and is used to deliver air into the distillation chamber or discharge samples in the distillation chamber to the outside.

4. The automatic tritium extraction device for environmental monitoring according to claim 1, wherein a main part of the distillation chamber is cylindrical, and the temperature control unit comprises heating elements encircling an outer wall of the main part of the distillation chamber and a temperature control switch disposed between the heating elements and an outer wall of the distillation chamber.

5. The automatic tritium extraction device for environmental monitoring according to claim 1, wherein the condensation unit comprises a condensing agent circulation chamber and a spiral heat-exchange tube disposed in the condensing agent circulation chamber, and the condensing agent circulation chamber comprises an inlet connected to the second vertical pipe and an outlet connected to a collection tank.

6. The automatic tritium extraction device for environmental monitoring according to claim 1, wherein the second pump is connected to a sample tank for containing the samples.

7. The automatic tritium extraction device for environmental monitoring according to claim 1, wherein the auxiliary condensation unit comprises a cavity for storing the condensing agent, a power device for cyclically delivering the condensing agent into a condensing agent circulation chamber, an upper tube connected to an upper part of the condensing agent circulation chamber, and a lower tube connected to a lower part of the condensing agent circulation chamber.

* * * * *